(12) United States Patent
Khatri et al.

(10) Patent No.: US 7,921,327 B2
(45) Date of Patent: Apr. 5, 2011

(54) SYSTEM AND METHOD FOR RECOVERY FROM UNCORRECTABLE BUS ERRORS IN A TEAMED NIC CONFIGURATION

(75) Inventors: Mukund Purshottam Khatri, Austin, TX (US); Theodore Stratton Webb, III, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 304 days.

(21) Appl. No.: 12/141,281

(22) Filed: Jun. 18, 2008

(65) Prior Publication Data
US 2009/0319836 A1    Dec. 24, 2009

(51) Int. Cl.
*G06F 11/00* (2006.01)
(52) U.S. Cl. .................. 714/5; 714/4; 714/43; 714/44
(58) Field of Classification Search .............. 714/4, 5, 714/43, 44, 56
See application file for complete search history.

(56) References Cited

U.S. PATENT DOCUMENTS

| | | | |
|---|---|---|---|
| 5,774,640 A * | 6/1998 | Kurio | 714/4 |
| 6,052,733 A * | 4/2000 | Mahalingam et al. | 714/4 |
| 6,763,479 B1 * | 7/2004 | Hebert | 714/4 |
| 7,460,470 B2 | 12/2008 | McGee et al. | 370/218 |
| 2003/0145117 A1 * | 7/2003 | Bhat | 714/4 |
| 2005/0270980 A1 | 12/2005 | McGee | 370/238 |
| 2005/0281190 A1 | 12/2005 | McGee et al. | 370/216 |
| 2006/0184536 A1 * | 8/2006 | Jreij et al. | 707/10 |
| 2007/0002738 A1 | 1/2007 | McGee | 370/230 |
| 2007/0025252 A1 | 2/2007 | McGee et al. | 370/235 |
| 2007/0025253 A1 | 2/2007 | Enstone et al. | 370/235 |
| 2007/0074067 A1 * | 3/2007 | Rothman et al. | 714/6 |
| 2007/0268820 A1 | 11/2007 | McGee et al. | 370/217 |
| 2008/0205402 A1 | 8/2008 | McGee et al. | 370/392 |
| 2009/0103430 A1 * | 4/2009 | Wang | 370/221 |

* cited by examiner

*Primary Examiner* — Robert Beausoliel
*Assistant Examiner* — Joseph D Manoskey
(74) *Attorney, Agent, or Firm* — Baker Botts L.L.P.

(57) ABSTRACT

A method for recovery from uncorrectable errors in an information handling system including an operating system (OS) and one or more network interface cards (NICS) is provided. The method may include detecting an uncorrectable error; determining whether the uncorrectable error is isolated to a particular NIC; determining whether the particular NIC is teamed with one or more other NICs; and notifying the OS of a successful recovery from the uncorrectable error if it is determined that (a) the uncorrectable error is isolated to a particular NIC, and (b) the particular NIC is teamed with one or more other NICs.

20 Claims, 2 Drawing Sheets

US 7,921,327 B2

SYSTEM AND METHOD FOR RECOVERY FROM UNCORRECTABLE BUS ERRORS IN A TEAMED NIC CONFIGURATION

TECHNICAL FIELD

The present disclosure relates in general to information handling systems, and more particularly to a method and system for recovery from uncorrectable errors, such as bus errors, in an information handling system comprising teamed network interface cards (NICs).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may use one or more network interface cards (NICs) allowing the information handling systems to communicate via a network, e.g., a Local Area Network (LAN). For example, a single NIC may be used or a plurality of NICs may be used together. A plurality of NICs used together may be referred to as "teamed" NICs. Teaming is a technique in which multiple NICs are combined by using, for example, a driver, such that if a failure is detected along the path through a NIC in the team, subsequent LAN traffic may be redirected to and handled by the other NICs in the team. The group of NICs in a team may appear to the outside world as a single logical NIC.

NICs teamed by a Peripheral Component Interconnect (PCI) bus may yield greater redundancy against hardware failures than single NICs. NICs that have been teamed using teaming software from NIC vendors (e.g., BROADCOM or INTEL) may continue operating in the face of single failures of cabling, switches, or NICs if the failure does not result in an error signaled on the PCI bus.

Teaming is often used in servers because it may yield greater uptime, redundancy against hardware failures, and/or better performance in configurations where the team is also used for load balancing.

However, there is a class of hardware errors against which teaming typically does not protect. If a PCI express uncorrected bus error (reported as part of Advanced Error Reporting (PCI AER)) occurs due to a NIC failure, the teamed NICs, and in fact the whole system, typically will not continue operating because traditionally PCI bus errors are considered catastrophic, and as result an operating system (OS) will shut down or abnormally end. For example, an OS such as WINDOWS or LINUX will bugcheck or panic, resulting in a system halt.

SUMMARY

In accordance with the teachings of the present disclosure, certain disadvantages and problems associated with uncorrectable bus errors in teamed NIC configurations have been substantially reduced or eliminated.

In accordance with one embodiment of the present disclosure, a method for recovery from uncorrectable errors in an information handling system including an operating system (OS) and one or more network interface cards (NICs) is provided. The method may include detecting an uncorrectable error; determining whether the uncorrectable error is isolated to a particular NIC; determining whether the particular NIC is teamed with one or more other NICs; and notifying the OS of a successful recovery from the uncorrectable error if it is determined that (a) the uncorrectable error is isolated to a particular NIC, and (b) the particular NIC is teamed with one or more other NICs.

According to another embodiment of the present disclosure, an information handling system may include an operating system (OS); a bus; a plurality of network interface cards (NICs) coupled to the bus; a hardware error handling system configured to detect an uncorrectable error relating to a particular NIC; means for determining whether the particular NIC is teamed with one or more other NICs; and means for determining whether the detected uncorrectable error is isolated to the particular NIC. The hardware error handling system may be configured to notify the OS of a successful recovery from the uncorrectable error if (a) the particular NIC is teamed with one or more other NICs and (b) the detected uncorrectable error is isolated to the particular NIC.

According to another embodiment of the present disclosure, logic instructions are encoded in tangible computer readable media and executable by a processor. The instructions may include instructions for detecting an uncorrectable error in an information handling system including an operating system (OS) and one or more network interface cards (NICs); instructions for determining whether the uncorrectable error is isolated to a particular NIC; instructions for determining whether the particular NIC is teamed with one or more other NICs; and instructions for notifying the OS of a successful recovery from the uncorrectable error if (a) it is determined that the uncorrectable error is isolated to a particular NIC, and (b) it is determined that the particular NIC is teamed with one or more other NICs.

At least one of the embodiments may provide additional redundancy in a teamed NIC configuration for an information handling system. The additional redundancy may relate to connections between NICs and a PCI(e) bus.

At least one of the embodiments may provide an information handling system to continue operating even if non-fatal uncorrectable bus errors are detected. For example, discontinued use of a teamed NIC relating to the uncorrectable bus error may allow the remaining NICs in the team to operate.

BRIEF DESCRIPTION OF THE DRAWINGS

A more complete understanding of the present embodiments and advantages thereof may be acquired by referring, by way of example, to the following description taken in conjunction with the accompanying drawings, in which like reference numbers indicate like features, and wherein.

DETAILED DESCRIPTION

Figure 1:
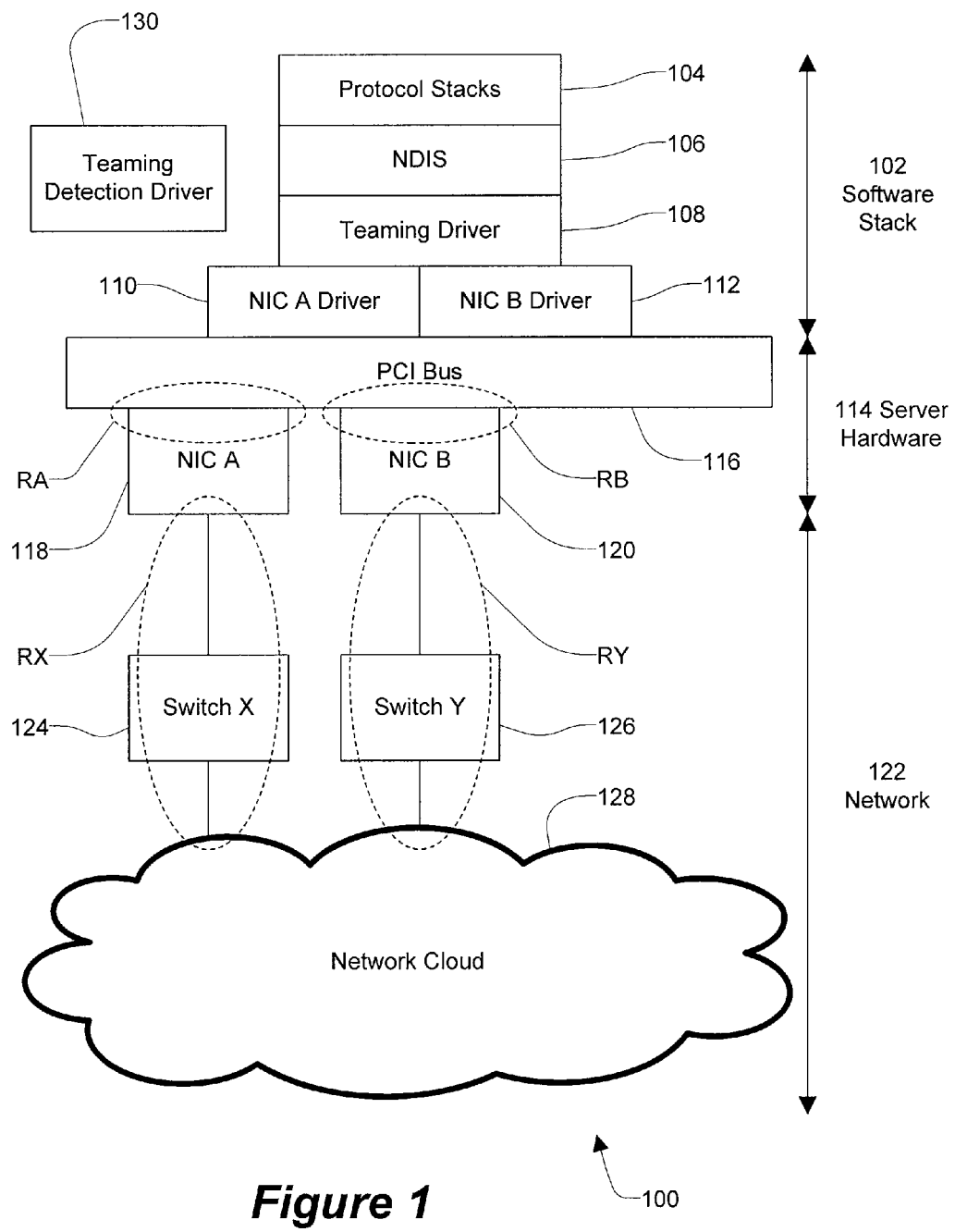
FIG. 1 illustrates a block diagram of an exemplary information handling system comprising teamed NICs, according to an embodiment of the present disclosure.
Figure 2:
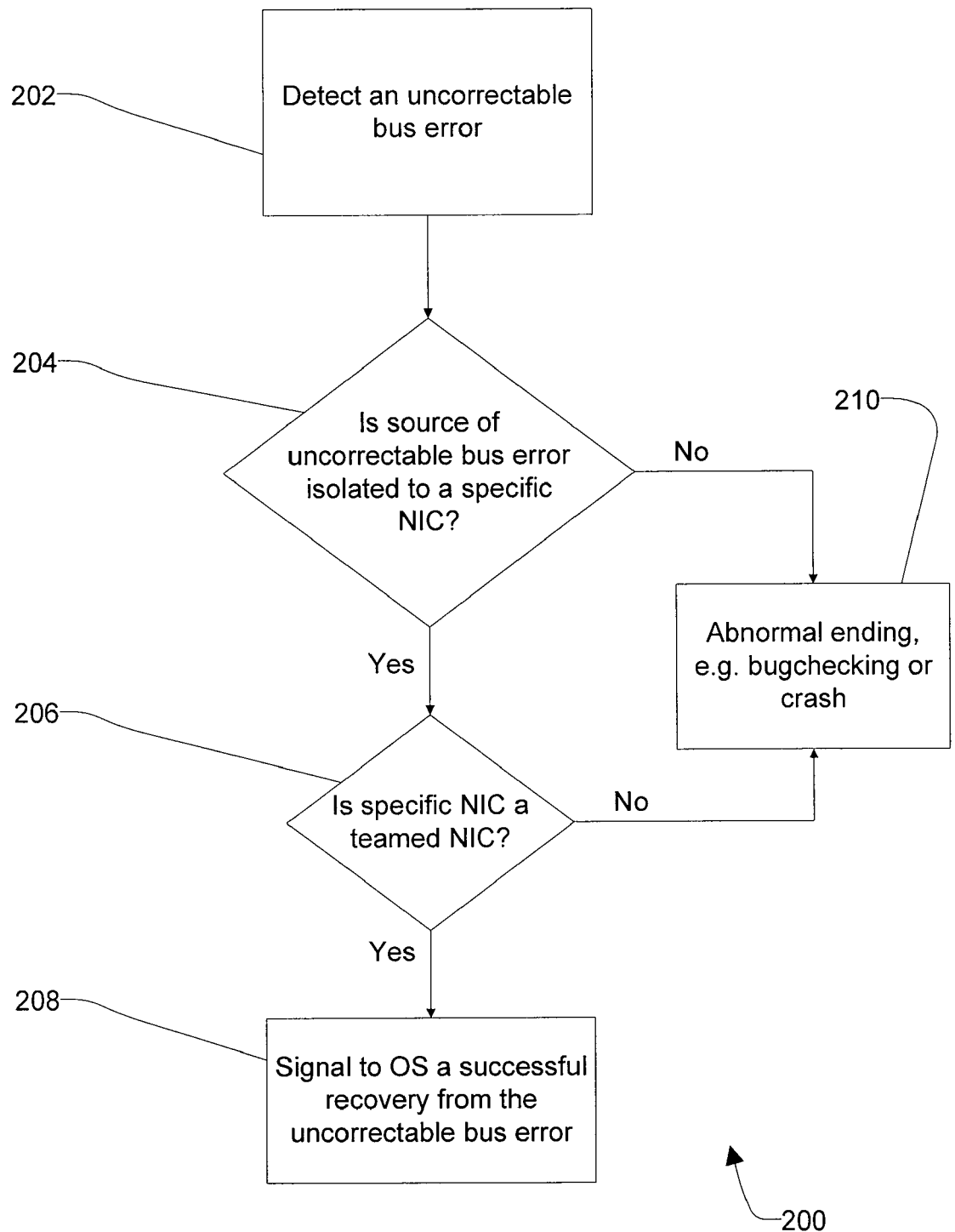
FIG. 2 illustrates a flow chart of an example method for recovering from uncorrectable bus errors in a teamed NIC configuration, according to an embodiment of the present disclosure.

Preferred embodiments and their advantages are best understood by reference to FIGS. 1 and 2.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, a NIC is a piece of hardware that allows an information handling system to communicate via a network. A plurality of NICs may be used together and the plurality of NICs used together may be referred to as "teamed" NICs. Teaming is a technique in which multiple NICs may be combined, such that if a failure is detected along the path through a particular NIC in the team, subsequent LAN traffic may be redirected to and handled by the other NICs in the team. The group of NICs in a team may appear to the outside world as a single logical NIC.

An information handling system may comprise an operating system (OS), e.g., Windows Server 2008. An OS may provide a system for handling hardware errors, e.g., the Windows Hardware Error Architecture (WHEA). WHEA provides a common infrastructure for handling hardware errors on Windows platforms. WHEA permits platform firmware (BIOS) and/or drivers to receive control during the processing of hardware errors within an information handling system. Firmware or drivers handling hardware errors may signal WHEA that an error nominally classified by the OS as uncorrected has been corrected, in which case the OS will not end abnormally, for example by bugchecking. According to the present disclosure, this function of WHEA may be used such that if a particular teamed NIC generates a PCI bus error that BIOS and/or a driver determines is isolated to the particular NIC or to a PCI bus segment used exclusively by the particular NIC, then a signal can be sent to WHEA indicating that the bus error has been "corrected," thus avoiding a halt or shut down of the OS (e.g., a fatal error or a bugcheck). The information handling system may then continue to operate but with reduced performance, wherein the other NICs in the team may handle subsequent traffic. It should be understood that WINDOWS, Windows Server 2008, and WHEA have been provided as examples only, and that this disclosure may apply to any other OS (e.g., LINUX) and system for handling hardware errors.

In some information handling systems, the OS may have hardware logo requirements. For example, the proposed Windows Server 2008 server hardware logo requirements require that Original Equipment Manufacturers (OEMs) implement WHEA support using either "WHEA plug-ins" or firmware using "firmware first model." A combination of both may also be possible. WHEA plug-ins (also known simply as plug-ins) are Windows kernel drivers that register with WHEA and participate in WHEA's hardware error processing. BIOS may participate in WHEA's firmware first model through the use of several Advanced Configuration and Power Interface (ACPI) style tables. In the firmware first model, the CPU and chipset may be configured to pass control to the BIOS when a hardware error occurs. If a hardware error occurs, then the BIOS may process it and pass control to Windows via, for example, a non-maskable interrupt (NMI), ACPI defined system control interrupt (SCI), or via OS polling.

Hardware errors in information handling systems may be divided into correctable errors and uncorrectable errors. The uncorrectable errors may be divided into fatal and non-fatal errors. Non-fatal uncorrectable errors may include errors in which software can continue to execute on the CPU of the information handling system. These errors may include, e.g., PCI bus errors, chipset errors, and/or memory errors. Plug-ins or firmware can participate in error source enumeration, error source control (enablement and disablement) and masking, and/or error handling. Error handling may comprise, e.g., retrieving additional error information of the error, logging the error, and attempting recovery. A successful recovery may be signaled to the OS of the information handling system. In embodiments of the present disclosure, an information handling system may continue to operate after an uncorrectable bus error, especially a non-fatal uncorrectable bus error, has been identified.

In some embodiments, WHEA support may be provided via firmware (e.g., BIOS) and/or via WHEA plug-ins. In other words, the agent translating the error into a recoverable or non-recoverable error may be in one exemplary embodiment the firmware (e.g., BIOS) and in another exemplary embodiment the OS (plug-ins) handling errors.

According to one embodiment, when the WHEA support is handled by firmware, e.g., BIOS, recovery from uncorrectable bus errors in a teamed NIC configuration may be done by using a teaming detection driver and/or firmware, e.g., BIOS, to signal the OS. A driver that detects teaming may be configured to determine whether a PCI based NIC is part of a team. Such driver may include or have access to data regarding how particular NIC vendors implement their teaming software, such that the driver can determine whether a particular NIC is teamed. For example, a driver may implement an ACPI callback interface that the BIOS may invoke to determine whether a particular PCI device is a teamed NIC. In another embodiment, the NIC may indicate in its configuration space whether or not it is teamed.

The OEM may use the firmware first model to achieve logo compliance. In addition to the BIOS code required for compliance, additional code may be added in the paths that handle PCI bus errors. This additional code may detect whether a NIC is the source of the bus error or if a PCI-to-PCI bridge exclusive to a NIC is the source of the bus error. In one embodiment, if a segment tied exclusively to a particular NIC reports an error or does not function properly, it may be determined that the particular NIC does not function. Error recovery may then be achieved from that exclusively tied NIC. Additionally, the BIOS may invoke the ACPI interface provided by the teaming detection driver to determine whether the particular NIC is teamed. If it is determined that the PCI bus error is confined to the particular NIC or bridges exclusive to the particular NIC and that the particular NIC is teamed, then the BIOS may signal the OS (e.g., WINDOWS) that the PCI bus error has been "corrected." Even if the error has not actually been corrected, a successful recovery may be signaled to the OS in order to allow continued (even if degraded) operation of the system based on the redundancy provided by the teamed NIC configuration.

According to one embodiment, when the WHEA support is handled by WHEA plug-ins, e.g., WINDOWS kernel drivers that register with WHEA and participate in WHEA's hardware error processing, recovery from uncorrectable bus errors in a teamed NIC configuration may be done by using a teaming detection driver and WHEA plug-ins to signal the OS. These plug-ins may be viewed as error handlers that are plugged in from outside the OS.

As mentioned above, the teaming detection driver may be a relatively simple driver that determines whether a PCI based NIC is part of a team. The driver may be configured such that it includes or has access to data regarding how particular NIC vendors implement their teaming software, in order to determine whether a particular NIC is teamed. An input/output control (ioctl) may be part of the user-to-kernel interface of an OS and may be employed to allow userspace code to communicate with hardware devices or kernel components. The driver may implement an ioctl (direct driver call interface) that the WHEA plug-ins call to determine whether a NIC is teamed with other NICs.

The OEM may use the WHEA plug-in model to achieve logo compliance. In addition to the code required for compliance, code may be added in the paths that handle PCI bus errors. This code may detect whether a particular NIC is the source of the bus error or if a PCI-to-PCI bridge exclusive to the particular NIC is the source of the bus error. Additionally, the plug-in(s) may invoke the interface provided by the teaming detection driver to determine whether the particular NIC is teamed. If the PCI bus error is either confined to the particular NIC or bridges exclusive to the particular NIC and the particular NIC is teamed, then the plug-in(s) may signal WINDOWS that the PCI bus error has been "corrected." For example, a signal indicating a successful recovery from the bus error may be sent to the OS. Due to the redundancy provided by the teamed NIC configuration, the OS may continue operating after the error with degraded performance, even if the error has not actually been corrected.

FIG. 1 illustrates a block diagram of an exemplary information handling system 100 comprising teamed NICS, according to an embodiment of the disclosure. A software stack 102 may comprise a protocol stack 104, Network Driver Interface Specification (NDIS) 106, a teaming driver 108, and, for example, a first driver 110 for a first NIC ("NIC A") and a second driver 112 for a second NIC ("NIC B"). Protocol stack 104 may be a particular software implementation of an information handling system networking protocol suite. NDIS 106 may be an application programming interface for NICs. Teaming driver 108 may team drivers 110 and 112 for NICs A and B, thus forming an example of a teamed NIC configuration.

In some embodiments, software stack 102 may include a teaming detection driver 130, which may detect whether a particular NIC is part of a teamed NIC configuration, as discussed above. This is only one technique for determining if a NIC is part of a teamed NIC configuration; other embodiments may use, for example, plug-ins via the OS.

A server hardware section 114 may comprise a PCI bus 116, NIC A 118, and NIC B 120. PCI bus 116 may comprise an information handling system bus, e.g., a PCIe bus, for attaching peripheral devices, e.g., NICs, to a motherboard.

A network section 122 may comprise a first switch X 124, a second switch Y 126, and a network 128. Switches 124 and 126 may comprise devices that perform switching, e.g., by forwarding and filtering chunks of data communication between ports, for example connected cables, based on MAC addresses in the data communication packets. Network 128 may include any type of network for an information handling system, e.g., a LAN a WAN, a WLAN, or the Internet.

The teaming provided by teaming driver 108 may provide redundancy in the areas marked RX and RY in FIG. 1. In addition to the redundancy areas RX and RY, some embodiments may provide additional redundancy in the areas marked RA and RB. Such additional redundancy in areas RA and RB may be achieved, for example, according to the method shown in FIG. 2.

FIG. 2 illustrates a flow chart of an example method for recovering from (non-fatal) uncorrectable bus errors in a teamed NIC configuration, according to at least one embodiment of the present disclosure.

According to one embodiment, method 200 preferably begins at step 202. As noted above, teachings of the present disclosure may be implemented in a variety of configurations of system 100. As such, the preferred initialization point for method 200 and the order of the steps 202-210 comprising method 200 may depend on the implementation chosen. For example, steps 204 and 206 may be performed in any order.

At step 202, a process within information handling system 100 for detecting bus errors detects an uncorrectable bus error relating to a specific NIC. For example, such error detection may be performed by PCI AER.

At step 204, it may be determined if the source of the uncorrectable bus error is isolated to the specific NIC. This may include, for example, determining if the uncorrectable bus error isolated to the NIC is an error isolated to a PCI bus segment used exclusively by the specific NIC. If the uncorrectable bus error is isolated to a specific NIC, then the method may proceed to step 206; otherwise, the method may proceed to step 210.

At step 206, it may be determined if the specific NIC is a teamed NIC. This may be determined, for example, by a driver (e.g., teaming detection driver 130) or directly by the OS as explained in more detail above. If it is determined that the specific NIC is a teamed NIC, the method may proceed to step 208; otherwise, the method may proceed to step 210.

In some embodiments, the OS may be used for determining whether the specific NIC is teamed and whether the uncorrectable bus error is isolated to the specific NIC, at steps 204 and 206.

At step 208, in response to determining (a) that the source of the uncorrectable bus error is isolated to the specific NIC at step 204 and (b) that the specific NIC is a teamed NIC, BIOS may signal the OS (e.g., WINDOWS) indicating a successful recovery from the uncorrectable bus error and the information handling system can continue to operate. Even if the error has not actually been corrected, a successful recovery may be signaled to the OS in order to allow continued (even if degraded) operation of the system based on the redundancy provided by the teamed NIC configuration. Because the specific NIC is not functioning properly, the information handling system may operate with reduced performance wherein the other NICs in the team may handle subsequent traffic.

At step 210, the information handling system has detected a fatal uncorrectable bus error and may thus shut down (e.g., crash) or trigger a bug check.

Although FIG. 2 discloses a particular number of steps to be taken with respect to method 200, method 200 may be executed with greater or lesser steps than those depicted in FIG. 2. For example, steps 204 and 206 may be performed at the same time. In addition, although FIG. 2 discloses a certain order of steps to be taken with respect to method 200, the steps comprising method 200 may be completed in any suitable order. For example, step 206 may be performed before step 204. Thus, in some embodiments, the determination of whether the specific NIC is teamed may be occur before the determination of whether the uncorrectable bus error is isolated to the specific NIC.

Method 200 may be implemented using system 100 or any other system operable to implement method 200. In certain embodiments, method 200 may be implemented partially or fully in software or firmware embodied in tangible computer-readable media.

In operation, information handling system 100 may detect non-fatal uncorrectable bus errors related to a specific NIC in a teamed NIC configuration and allow the information handling system 100 to continue operating without the specific NIC. If a PCI express uncorrected bus error occur, then the system and method may detect if the error is isolated to a specific NIC in a team and signal the OS that no system shut down or halt is necessary. Instead the information handling system can continue to operate without the specific NIC.

In some embodiments, the uncorrectable error may be a bus error. The uncorrectable error may be a non-fatal uncorrectable error or a non-fatal uncorrectable bus error. For example, the uncorrectable error may be a bus error isolated to a Peripheral Component Interconnect (PCI) bus segment used exclusively by the particular NIC.

Using the methods and systems disclosed herein, certain problems associated with non-fatal uncorrectable bus errors in an information handling systems may be improved, reduced, or eliminated. For example, the methods and systems disclosed herein may allow an information handling system to continue to operate after an uncorrectable bus error related to one (or more) NIC in a teamed NIC configuration.

Although the present disclosure has been described in detail, it should be understood that various changes, substitutions, and alterations can be made hereto without departing from the spirit and the scope of the disclosure as defined by the appended claims.

What is claimed is:

1. A method for recovery from uncorrectable errors in an information handling system including an operating system (OS) and one or more network interface cards (NICs), the method comprising:
   detecting an uncorrectable error;
   determining whether the uncorrectable error is isolated to a particular NIC;
   determining whether the particular NIC is teamed with one or more other NICs; and
   in response to determining that (a) the uncorrectable error is isolated to a particular NIC, and (b) the particular NIC is teamed with one or more other NICs, notifying the OS of a successful recovery from the uncorrectable error.

2. A method according to claim 1, wherein a driver is used for determining whether the particular NIC is teamed with one or more other NICs.

3. A method according to claim 1, wherein firmware is used for determining if the uncorrectable error is isolated to a particular NIC.

4. A method according to claim 1, wherein the OS is used for determining whether the particular NIC is teamed with one or more other NICs, whether the uncorrectable error is isolated to a particular NIC, or both.

5. A method according to claim 1, wherein the OS is notified by using a hardware error handling system.

6. A method according to claim 1, wherein notifying the OS of a successful recovery from the uncorrectable error is performed using Windows Hardware Error Architecture (WHEA) functions.

7. A method according to claim 1, wherein the uncorrectable error is a bus error isolated to a Peripheral Component Interconnect (PCI) bus segment used exclusively by the particular NIC.

8. An information handling system, comprising:
   an operating system (OS);
   a bus;
   a plurality of network interface cards (NICs) coupled to the bus;
   a hardware error handling system configured to detect an uncorrectable error relating to a particular NIC;
   means for determining whether the particular NIC is teamed with one or more other NICs; and
   means for determining whether the detected uncorrectable error is isolated to the particular NIC;
   wherein the hardware error handling system is configured to notify the OS of a successful recovery from the uncorrectable error if (a) the particular NIC is teamed with one or more other NICs and (b) the detected uncorrectable error is isolated to the particular NIC.

9. An information handling system according to claim 8, wherein the means for determining whether the particular NIC is teamed with one or more other NICs comprises a driver.

10. An information handling system according to claim 8, wherein the means for determining whether the detected uncorrectable error is isolated to the particular NIC comprises firmware.

11. An information handling system according to claim 8, wherein the means for determining whether the particular NIC is teamed with one or more other NICs, the means for determining whether the detected uncorrectable error is isolated to the particular NIC, or both, are provided by the OS.

12. An information handling system according to claim 8, wherein the hardware error handling system comprises Windows Hardware Error Architecture (WHEA) functions to notify the OS of a successful recovery from the uncorrectable error.

13. An information handling system according to claim 8, wherein the uncorrectable error is a bus error isolated to a Peripheral Component Interconnect (PCI) bus segment used exclusively by the particular NIC.

14. A computer readable storage media storing computer readable instructions comprising:

instructions for detecting an uncorrectable error in an information handling system including an operating system (OS) and one or more network interface cards (NICs);

instructions for determining whether the uncorrectable error is isolated to a particular NIC;

instructions for determining whether the particular NIC is teamed with one or more other NICs; and instructions for notifying the OS of a successful recovery from the uncorrectable error if (a) it is determined that the uncorrectable error is isolated to a particular NIC, and (b) it is determined that the particular NIC is teamed with one or more other NICs.

15. The computer readable storage media according to claim 14, wherein the instructions for determining whether the particular NIC is teamed with one or more other NICs are provided in a driver.

16. The computer readable storage media according to claim 14, wherein the instructions for determining if the uncorrectable error is isolated to a particular NIC are provided in firmware.

17. The computer readable storage media according to claim 14, wherein the instructions for determining whether the particular NIC is teamed with one or more other NICs, the instructions for determining if the uncorrectable error is isolated to a particular NIC, or both, are provided in the OS.

18. The computer readable storage media according to claim 14, wherein the instructions for notifying the OS of a successful recovery from the uncorrectable error are provided in a hardware error handling system.

19. The computer readable storage media according to claim 14, wherein the instructions for notifying the OS of a successful recovery from the uncorrectable error comprise Windows Hardware Error Architecture (WHEA) instructions.

20. The computer readable storage media according to claim 14, wherein the uncorrectable error is a bus error isolated to a Peripheral Component Interconnect (PCI) bus segment used exclusively by the particular NIC.

* * * * *